(12) United States Patent
Brinkhaus (10) Patent No.: US 10,409,261 B2
(45) Date of Patent: Sep. 10, 2019

(54) METHOD FOR MONITORING A MACHINE TOOL

(71) Applicant: KOMET Deutschland GmbH, Besigheim (DE)

(72) Inventor: Jan-Wilm Brinkhaus, Hannover (DE)

(73) Assignee: KOMET GROGF GMBH, Besigheim (DE)

(*) Notice: Subject to any disclaimer, the term of this patent is extended or adjusted under 35 U.S.C. 154(b) by 42 days.

(21) Appl. No.: 15/546,134

(22) PCT Filed: Feb. 4, 2016

(86) PCT No.: PCT/EP2016/052382
§ 371 (c)(1),
(2) Date: Jul. 25, 2017

(87) PCT Pub. No.: WO2016/128290
PCT Pub. Date: Aug. 18, 2016

(65) Prior Publication Data
US 2018/0011474 A1    Jan. 11, 2018

(30) Foreign Application Priority Data

Feb. 10, 2015  (DE) .................. 10 2015 001 557

(51) Int. Cl.
*G05B 19/4065* (2006.01)
(52) U.S. Cl.
CPC ............... *G05B 19/4065* (2013.01); *G05B 2219/33287* (2013.01); *G05B 2219/35364* (2013.01); *Y02P 90/265* (2015.11)
(58) Field of Classification Search
None
See application file for complete search history.

(56) References Cited

U.S. PATENT DOCUMENTS

| | | | | |
|---|---|---|---|---|
| 4,551,808 A | * | 11/1985 | Smith | B23Q 17/0947 318/565 |
| 5,418,711 A | * | 5/1995 | Pomerleau | B26D 5/00 700/134 |

(Continued)

FOREIGN PATENT DOCUMENTS

| | | |
|---|---|---|
| DE | 101 33 612 A1 | 2/2003 |
| DE | 10 2009 025 167 B3 | 9/2010 |
| EP | 0 813 130 A2 | 12/1997 |

OTHER PUBLICATIONS

Ing. Dirk Lange: "Intelligent process monitoring system with integrated control system", Artis GmbH, pp. 1-12, Nov. 7, 2001.

*Primary Examiner* — Thomas C Lee
*Assistant Examiner* — Gary Collins
(74) *Attorney, Agent, or Firm* — W&C IP (57) ABSTRACT

Machine tool (10), in particular a cutting machine tool, comprising at least one digital storage unit (34) in which a machining program code that codes the machining process of a workpiece by means of the machine tool (10) and a monitoring program code that codes a monitoring process for monitoring the machining process are stored. According to the invention, it is intended that a script editor (38) is stored in the digital storage unit (34) for inputting and/or reading modification commands that change the monitoring process, and a compiler is also stored in the digital storage unit (34) that is designed to automatically generate an executable process monitoring pro- gram code from the monitoring program code and the modification commands.

14 Claims, 3 Drawing Sheets

(56) References Cited

U.S. PATENT DOCUMENTS

| | | | | |
|---|---|---|---|---|
| 5,453,933 A | * | 9/1995 | Wright | G05B 19/414 |
| | | | | 700/181 |
| 6,384,560 B1 | * | 5/2002 | Kakino | G05B 19/404 |
| | | | | 318/433 |
| 2013/0301248 A1 | | 11/2013 | Gibbs et al. | |
| 2015/0261207 A1 | * | 9/2015 | Wunderlich | G05B 19/4065 |
| | | | | 700/175 |

* cited by examiner

METHOD FOR MONITORING A MACHINE TOOL

FIELD OF THE INVENTION

The invention relates to a machine tool, in particular a cutting machine tool, comprising at least one digital storage unit in which a machining program code that codes the machining process of a workpiece by means of the machine tool and a monitoring program code that codes a monitoring process for monitoring the machining process are stored.

According to a second aspect, the invention relates to a method for monitoring a machine tool featuring the step of reading a monitoring program code that codes a machining process program for the machining process of a workpiece by means of the machine tool.

BACKGROUND

The purpose of monitoring systems for machine tools is to monitor the machining process by means of the machine tool. Additional elements, such as torques, drive powers and/or forces, can also be recorded and continually compared with a pre-determined process. Any deviations that may occur indicate an error in the process and a warning signal can be emitted, or the machining process halted. A method of this type is described in DE 10 2009 025 167 B3.

To be able to quickly recognise errors in the machining process, the monitoring process has to work at a high sampling rate, meaning that a large number of measured values must be recorded and processed per time unit.

Despite the advantages provided by monitoring a machining process, it has thus far, for the most part, only been possible to conduct process monitoring in mass production.

SUMMARY

The invention aims to improve the monitoring of machine tools such that it is also possible to create a monitoring program for the machining process of small series' without too great an effort.

The invention solves the problem by means of a machine tool according to the introductory part of claim 1 in whose digital storage unit a script editor is stored for inputting and/or reading modification commands that change the monitoring process, wherein a compiler that is designed to automatically generate an executable process-monitoring program code from the monitoring program code and the modification commands is also stored in the storage unit. The invention also solves the problem by means of a machine tool monitoring device with the features in claim 9.

According to a second aspect, the invention solves the problem by means of a method according to the introductory part of claim 10 featuring the steps: recording of at least one modification command by means of a script editor; an automatic generation of a compiled or pre-compiled process monitoring program code from the monitoring program code and the modification commands; and a monitoring of the machine tool by means of a process monitoring program code. In other words, the monitoring of the machine tool should be understood to mean the monitoring of the machining process that is executed by the machine tool.

The advantage of the invention is that it enables the machining process of workpieces in small series'. To date, the complexity of generating a monitoring program for the machining process of small series' has been so great that the gains in process reliability have not justified the monitoring.

The invention enables an existing machining process program to be individually adjusted to the particular machining process task.

It is also advantageous that a monitoring unit that comprises the digital storage unit and a processor can be utilized especially efficiently. This enables the monitoring program code to be written such that it requires a particularly small number of resources and can be rapidly processed. This generally results in the monitoring program code being difficult to read for human beings. This is especially true if the monitoring program code appears in a compiled format. Thanks to the script editor, program modules can be maintained in a run-time optimized and pre-prepared format, and can be activated and deactivated by the modification commands. This means that it is only necessary to retain the essential part of the process monitoring program in the monitoring unit, but not parts that have merely been programmed as a precaution and are not used.

On the basis of the present description, the feature that the machine tool comprises at least one digital storage unit should be understood particularly to mean that it is possible that the machine tool comprises two, three or more digital storage units. It is possible, but not necessary, for the monitoring program code and/or the process monitoring program code to be stored in one of these storage units. In particular, it is also possible that the corresponding program codes are divided across two or more storage units.

The compiler should be understood particularly to mean a program that is at least also designed to conduct a syntax check of the monitoring program code and the modification commands, and to generate a machine code or an intermediate language.

The machine code should be understood to mean a sequence of commands that can be carried out automatically, without any further conversion, by a machine control system that is a component of a machine tool according to the invention and controls the machining process of the material.

The intermediate language should be understood to mean a sequence of characters which can be translated into machine language without a syntax check. The intermediate language preferably refers to bytecode, IL (intermediate language) or MSIL (Microsoft intermediate language).

The monitoring program code should be understood to mean a sequence of commands that describes the monitoring process, i.e. it codes. The monitoring program code may be available in a compiled format, for example in machine language, and/or an uncompiled format.

The machine tool monitoring device should be understood particularly to mean a device that is designed to connect with a machine such that the two combine to form a machine tool according to the invention.

The feature that the script editor is designed for inputting and/or reading should be understood particularly to mean that one or several commands can be entered into the script editor, for example by means of a keyboard and/or touch screen, and that a command entered in this manner can be accessed. The script editor may also be designed to select functions by means of a graphic user interface, resulting in the compiler permanently integrating the functions into the executed monitoring code. The compiler may comprise a linker.

When a command is referred to, this should be understood to mean at least one command.

The machine tool monitoring device should be understood particularly to mean a device that is designed to connect to a control unit of a machine tool such that performance indicators can be retrieved from the control unit.

The machine tool preferably has a monitoring unit that comprises the at least one storage unit and a processor which is configured to generate and process the process monitoring program code. In other words, the process monitoring program code is both generated and processed by the same processor. This allows the process monitoring procedure that is coded by the process monitoring program code to be easily adjusted. It is only necessary to amend the modification commands in the script editor, which—according to a preferred embodiment—also runs on the processor. The processor can then generate and execute the process monitoring program code. In particular, it is possible to respond spontaneously to changing demands on the monitoring by altering the process monitoring procedure by changing the modification commands.

It is possible, but not necessary, for the monitoring unit to be part of the machine control system. It is also possible that the machine control system has a control system processor that is different to the processor in the monitoring unit. It is beneficial if the monitoring program code codes a monitoring process that captures acceleration data which describes a linear tool head acceleration of the tool spindle, wherein the compiler is designed in such a way that, by means of the modification commands, it is possible to select the machine axes whose accelerations are included in a vector sum for the calculation of the tool head acceleration.

According to a preferred embodiment, the machine tool comprises a first drive, at least a second drive, a machine control system that is designed to capture a first performance indicator which describes a first drive torque of the first drive, and a second performance indicator which describes a second drive torque of the second drive, wherein the script editor is configured to input and/or read a modification command in the form of a selection command and wherein the compiler is designed such that, by means of the selection command, it is possible to select the performance indicator on which the execution of the monitoring procedure is based.

The performance indicator should be understood to mean a measured value which, in the event of a change of said value, unequivocally indicates a change in the torque of the respective drive. For example, the performance indicator may refer to the current drive power or the electric motor current of the drive.

A data source can be selected by means of the selection command. In other words, by means of the selection command, it is possible to select the relevant component of the machine tool about which related data is captured by the process monitoring program code and used for monitoring.

It is thus possible to monitor only the machine axis which moves the tool. If, within the scope of the monitoring program, the revolver that moves tools so they can be removed by a tool holder is driven, the selection command can be used to select the drive of the revolver such that only the drive torque of the drive of the revolver is monitored.

It is also beneficial if the script editor is configured to input and/or read a modification command in the form of a script selection command by means of which pre-prepared monitoring modules or scripts can be retrieved. It is then possible, by means of a selection command and a script selection command, to determine which data should be processed by which program modules at which point in the monitoring. If the monitoring task then changes because, for example, an additional tool is introduced, the program monitoring procedure can be easily modified.

The machine tool preferably comprises (a) a tool spindle that has a tool holder for holding a tool for the machining process of the workpiece, and (b) a machine control unit by means of which the tool that is held in the tool holder can be recorded, wherein (c) the script editor is configured to input and/or read a modification command in the form of a condition command and wherein (d) the compiler is designed such that the drive torque on which the execution of the monitoring process is based can be selected at least also by means of the condition command, depending on the tool held.

The condition command causes the machine control system to read which tool is held in the tool holder, i.e. which tool will carry out the next machining process. The load parameter to be monitored is then selected depending on this tool. For example, if the tool held is a drill, it may be useful to monitor the drive torque of the spindle that rotates the drill. Conversely, if the tool is a milling head, it may be advantageous to monitor the torque of the respective machine axis that is responsible for the feed movement of the milling cutter. It should be noted that it is possible to monitor several machine axes, particularly by calculating a common performance indicator. This performance indicator may be a measurement for the feed force, for example. A condition command may also consist of several partial commands.

The first drive is preferably a tool spindle that comprises a tool holder for holding a tool for the machining process of the workpiece, wherein the second drive is a propulsion axis, i.e. a machine axis, that causes a feed movement of the tool. It is also possible that one of the two drives is the drive of a revolver, by means of which a tool can be fed.

The machine tool preferably comprises a first machine axis, at least a second machine axis and at least a tool spindle for holding and driving a tool. It is beneficial if the monitoring program code codes a monitoring process that captures at least one measured value that is allocated to a machine axis, wherein the measured value can be used to determine a force component acting on the tool head, wherein the compiler is designed such that the modification command can be used to select the machine axes whose allocated measured values are included in a vector sum for the calculation of a force acting on the tool head.

In this context, the tool head should be understood to mean the component of the machine tool that can be positioned in the space using the propulsion axis and to which the workpiece is attached. Due to the fact that it is possible to select the machine axes whose measured values are included in a vector sum, it is especially easy to calculate the force acting on the tool head.

The machine control system is preferably designed to automatically control the at least one machine axis with the aid of the machining process program and to generate at least one sequence of measured values, subject to a control variable that characterises the progress of the machining process program. For example, this control variable may be the time or the total product from the time multiplied by the respective value of a global speed controller, which may also be referred to as an override control system and indicates the processing speed of the machining process program.

It is beneficial if the script editor is configured to input and/or read a modification command in the form of a filter command, wherein the compiler is designed such that the filter command can be used to apply a mathematical filter to the pre-defined sequence of measured values. A filter of this type is a transformation which assigns an input sequence, namely the sequence of measured values, and an output sequence, or a vector and a scale. Examples for filters include smoothing filters, extremes filters that indicate the maximum and/or minimum of a sequence in a predetermined interval, mean value filters or convolution filters. In particular, the filter refers to a non-recursive filter. It is especially preferable if the filter refers to a reduction filter. A reduction filter allocates a reduced sequence to a sequence of measured values, the reduced sequence having fewer consecutive links with regard to an interval of the control variables, in particular a maximum of a tenth of the consecutive links.

The script editor is preferably designed to input and/or read a modification command in the form of a duration command and/or in the form of a measured value selection from a pre-determined quantity of measured values, wherein the compiler is designed such that, by means of the duration command, it is possible to select an interval duration for the calculation of a maximum value and/or a minimum value of the measured value. This may refer to a moving calculation, the maximum of which is calculated over a moving interval. Alternatively, it is also possible to define the length of contiguous intervals via the duration command. The duration should be understood particularly to mean a duration that is measured in units of the control variable.

The script editor is preferably designed to input and/or read a modification command in the form of a documentation command and a condition, and the compiler is designed in such a way that, by means of the documentation command, a document can be generated and/or modified and/or a warning signal can be generated, subject to the command. A documentation command may also consist of several partial commands.

BRIEF DESCRIPTION OF THE DRAWINGS

In the following, the invention will be explained in more detail by way of the attached drawings. They show FIG. 1 a schematic view of a machine tool according to the invention, FIG. 2 a diagram with the method blocks of a method according to the invention and FIG. 3 a flowchart of a method according to the invention.

DETAILED DESCRIPTION

Figure 1:
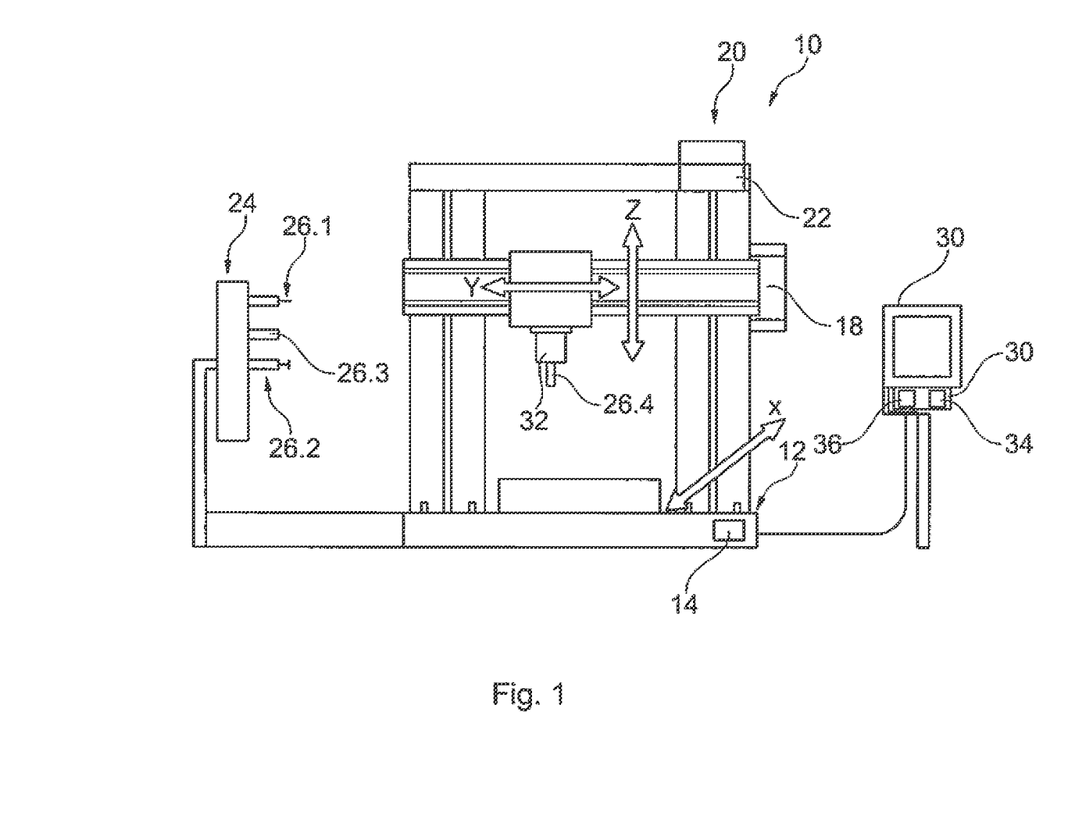

FIG. 1 shows a schematic view of a machine tool 10 according to the invention that comprises a first machine axis 12, by means of which a first drive 14 can be moved. The machine tool 10 also has a second machine axis 16 that is driven by means of a second schematically depicted drive 18. A third machine axis 20 can be driven by a third drive 22. The machine tool 10 also has a revolver 24 in which the tools 26.1, 26.2, . . . are held. The tool 26.4 is attached to a tool head 28.

The machine tool 10 comprises a machine control system 30 that is electronically connected to the drives 14, 18, 22, as well as to a drive of the revolver 24 and a spindle 32. The machine tool 10 also has a digital storage unit 34 which, in the present case, is part of the machine control system 30 and in which a machining process program is stored. A processor 36 of the machine control system 30 accesses the digital storage unit 34 and controls the components of the machine tool 10 such that a workpiece is processed according to a machining process program that is stored in the digital storage unit 34.

A monitoring program code is also stored in the digital storage unit 34, which codes a monitoring process for monitoring this machining process. For example, the monitoring process comprises the steps of reading an output of at least one of the drives 12, 16, 22 and comparing these drive outputs with the drive outputs of previous machining process cycles. The machine control system 30 is configured to record a first performance indicator $P_{14}$ in the form of the current power of the first drive 14, a second performance indicator $P_{18}$ of a current power of the second drive 18, and a third performance indicator $P_{22}$ in the form of a current power of the third drive 22.

Using these performance indicators and with the aid of the respective speed of the drive, the machine control system 30 identifies the torque and from that, the force that is acting on the tool head 28. Alternatively or additionally, the machine control system 30 identifies a change in the performance indicators and from that, calculates a change in the force on the tool head 28. By means of numerical integration of the changes in the force, it is possible to calculate the current force from a force that is known initially.

Figure 2:
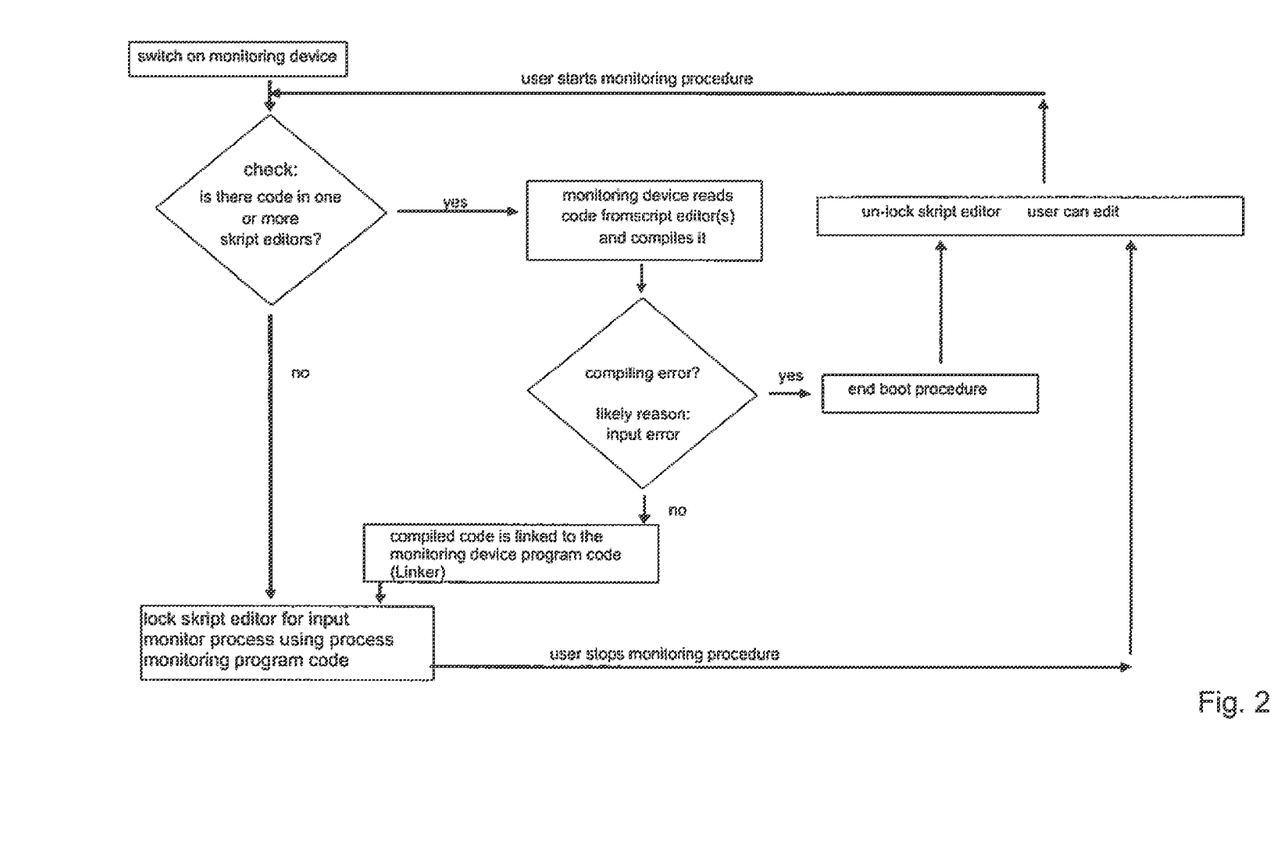

FIG. 2 depicts a diagram with the method blocks of a method according to the invention. First of all, the machine tool monitoring device is switched on, and the digital storage unit is automatically contacted and a basic program started that initially checks whether a code is available in one or several script editors. If that is the case, the code is read from the script editor (38) and compiled. If there are no compiling errors, the compiled code is added to the existing monitoring program code. The script editor is then blocked for further inputs. The machining process of the machine tool is conducted with the aid of the process monitoring program code, which comes from the monitoring program code, which is not altered, as well as the code that is generated on the basis of the modification commands.

Upon the user's request, the script editor (38) is released and the user can change the script that has been entered in the script editor.

If an error with the compiler is established, an error message can be issued so the user can correct the script.

Figure 3:
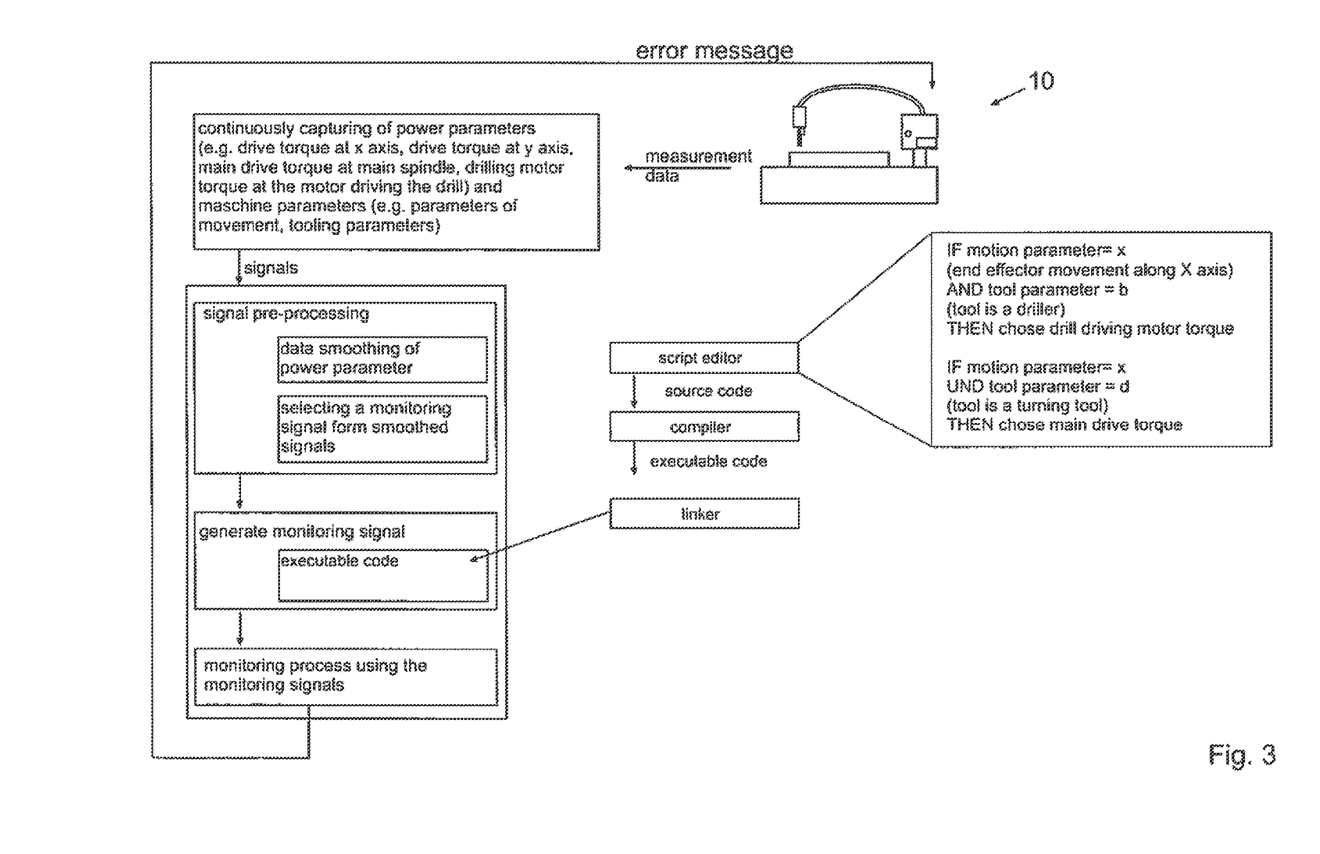

FIG. 3 schematically depicts the operating principle of the method according to the invention. Measured values, especially performance indicators, and machine parameters are continually captured by the machine tool 10. A machine parameter should be understood to mean a value that describes the non-dynamic state of the machine. For example, the machine parameter may be a movement parameter or a placement parameter. A placement parameter indicates which tool and/or which type of tool is used for the machining process. For example, a placement parameter indicates whether the tool that is currently in use is a milling cutter, a drill, a turning tool or another tool. The movement parameter indicates the axis along which the tool should move in the next planned movement.

The measured values are received in the form of digital signals and are initially pre-processed using the monitoring program code, i.e. a program part that cannot be changed by an input in the script editor 38. The received, pre-processed signal is then processed with the aid of a program code that has also been defined at least by an input in the script editor. If the machine tool 10 is processing a workpiece, the machining process is monitored using the process monitoring program code, which comprises elements of monitoring program code and modification commands.

FIG. 3 shows what the script editor 38 may look like. There are two condition commands to be input that are used to select which performance indicator is used to monitor the machining process. The type of monitoring executed with the selected performance indicator is described, for example, in DE 2009 025 167 B3 and is therefore not described in greater detail.

REFERENCE LIST 10 machine tool
12 first machine axis
12 first drive
16 second machine axis
18 second drive
20 third machine axis
22 third drive
24 revolver
26 tool
28 tool head
30 machine control system
32 spindle
34 digital storage unit
36 processor
38 script editor
$P_{14}$ first performance indicator
$P_{18}$ second performance indicator
$P_{22}$ third performance indicator

The invention claimed is:

1. A machine tool, comprising:
 at least one digital storage unit which stores
  a machining program code that codes for a machining process of a workpiece by means of the machine tool,
  a monitoring program code that codes a monitoring process for monitoring the machining process,
  a script editor for inputting and/or reading modification commands selection of which change the monitoring process, wherein selectable modification commands comprise first and second modification commands corresponding with first and second machine parameters, respectively, and
  a compiler configured to automatically generate an executable process monitoring program code from the monitoring program code and selected modification commands, the executable process monitoring program code being shorter if the first modification command is selected than if the second or both modification commands are selected,
 a processor configured to run the compiler and to execute the process monitoring program code during the machining process.

2. The machine tool according to claim 1, further comprising:
 a monitoring unit that comprises the at least one digital storage unit.

3. The machine tool according to claim 1, further comprising:
 a first drive,
 at least a second drive,
 a machine control system designed to record a first performance indicator, which describes a first drive torque of the first drive, and a second performance indicator, which describes a second drive torque of the second drive,
 wherein the script editor is designed to configured for input of a modification command in the form of a selection command, and
 wherein the compiler is configured such that, by means of the selection command, the first or second performance indicators are selectable on which the execution of the monitoring process is based.

4. The machine tool according to claim 1, further comprising:
 a tool spindle that comprises a tool holder for holding a tool for the machining processing of the workpiece, and
 a machine control system, by means of which the tool that is held in the tool holder is accessible,
 wherein the script editor is configured for input of a modification command in the form of a condition command, and
 the compiler is configured such that, at least also by means of the condition command, depending on the tool held by the tool holder, a performance indicator is selectable on which the execution of the monitoring process is based, wherein the selected performance indicator differs for a first tool as compared to a second tool.

5. The machine tool of claim 4 wherein the performance indicator is the drive torque.

6. The machine tool of claim 4 wherein the machine tool is a cutting machine.

7. A machine tool according to claim 1, further comprising:
 a first machine axis,
 at least a second machine axis, and
 at least one tool spindle for holding and driving a tool,
 wherein the monitoring process records at least one measured value which is allocated to the first machine axis or the at least a second machine axis, and wherein a force component that is acting on the tool head is determinable by the monitoring process,
 wherein the compiler is configured such that, by means of the modification command, the first machine axis or the at least a second machine axis is selectable whose allocated measured values are included in a vector sum for a calculation of a force that is acting on the tool head.

8. The machine tool according to claim 7, further comprising:
 a machine control system configured to
  automatically drive the first machine axis with the aid of the machining process program, and
  record at least one sequence of measured values, subject to a control variable that characterizes progress of the machining process program.

9. The machine tool according to claim 1, wherein
 the script editor is configured for input of a modification command in the form of a duration command and/or a modification command in the form of a measured value selection from a pre-determined quantity of measured values, and
 the compiler is configured such that, by means of the duration command, an interval duration can be selected for calculation of a maximum value and/or a minimum value of a measured value.

10. The machine tool according to claim 1, wherein
 the script editor is configured for input of a modification command in the form of a documentation command and a condition, and
 the compiler is configured such that, by means of the documentation command, a document is generatable and/or modifiable and/or a warning signal is generatable, subject to the condition.

11. The machine tool of claim 1, wherein the first and second machine parameters are movement parameters or placement parameters.

12. The machine tool of claim 11, wherein the first and second machine parameters are placement parameters, and the first placement parameter indicates a first tool and the second placement parameters indicates a second tool different from the first tool.

13. A machine tool monitoring device to be connected to a machine tool, comprising:
   at least one digital storage unit which stores
      a monitoring program code that codes a monitoring process for monitoring the machining process is stored,
      a script editor for inputting and/or reading modification commands selection of which change the monitoring process, wherein selectable modification commands comprise first and second modification commands corresponding with first and second machine parameters, respectively, and
      a compiler configured to automatically generate an executable process monitoring program code from the monitoring program code and the modification commands, the executable process monitoring program code being shorter if the first modification command is selected than if the second or both modification commands are selected;
   a processor configured to run the compiler and to execute the process monitoring program code during the machining process.

14. A method for monitoring a machine tool, comprising the steps of:
   reading of a monitoring program code that codes a monitoring process for monitoring the machining process of a workpiece by the machine tool,
   recording of at least one selected modification command in a script editor, wherein selectable modification commands comprise first and second modification commands corresponding with first and second machine parameters, respectively,
   automatic generation of a compiled or pre-compiled executable process monitoring program code from the monitoring program code and the modification commands, the executable process monitoring program code being shorter if the first modification command is selected than if the second or both modification commands are selected, and
   monitoring of the machine tool during the machining process of the workpiece by means of the process monitoring program code which is executed.

* * * * *

UNITED STATES PATENT AND TRADEMARK OFFICE
CERTIFICATE OF CORRECTION

| | |
|---|---|
| PATENT NO. | : 10,409,261 B2 |
| APPLICATION NO. | : 15/546134 |
| DATED | : September 10, 2019 |
| INVENTOR(S) | : Jan-Wilm Brinkhaus |

It is certified that error appears in the above-identified patent and that said Letters Patent is hereby corrected as shown below:

On the Title Page

Please correct (73) the assignee name to KOMET Deutschland GmbH

Signed and Sealed this
Seventh Day of April, 2020

Andrei Iancu
*Director of the United States Patent and Trademark Office*